(12) United States Patent
Yao et al.

(10) Patent No.: US 10,736,375 B2
(45) Date of Patent: Aug. 11, 2020

(54) SHOE SOLE WITH ZONES FILLED WITH MULTIPLE FOAMING MATERIAL AND AN INTERCHANGEABLE COMPACT MAGLEV MODULE

(71) Applicants: Kang Yao, Delray Beach, FL (US); Nan An, Boynton Beach, FL (US)

(72) Inventors: Kang Yao, Delray Beach, FL (US); Nan An, Boynton Beach, FL (US)

(73) Assignee: Kang Yao, Delray Beach, FL (US)

( * ) Notice: Subject to any disclaimer, the term of this patent is extended or adjusted under 35 U.S.C. 154(b) by 262 days.

(21) Appl. No.: 16/026,885

(22) Filed: Jul. 3, 2018

(65) Prior Publication Data

US 2020/0008513 A1  Jan. 9, 2020

(51) Int. Cl.
| | |
|---|---|
| *F16F 6/00* | (2006.01) |
| *A43B 1/00* | (2006.01) |
| *A43B 5/04* | (2006.01) |
| *A43B 13/36* | (2006.01) |
| *A43B 13/16* | (2006.01) |
| *A43B 13/18* | (2006.01) |

(52) U.S. Cl.
CPC .......... *A43B 1/0054* (2013.01); *A43B 5/0417* (2013.01); *A43B 13/16* (2013.01); *A43B 13/187* (2013.01); *A43B 13/36* (2013.01); *F16F 6/005* (2013.01); *F16F 2222/06* (2013.01)

(58) Field of Classification Search
None
See application file for complete search history.

(56) References Cited

U.S. PATENT DOCUMENTS

| | | | | |
|---|---|---|---|---|
| 5,236,186 | A | * | 8/1993 | Weltin .................... F16F 7/108 188/267 |
| 5,736,798 | A | * | 4/1998 | O'Brien .................. B24B 13/00 310/103 |
| 2010/0011616 | A1 | * | 1/2010 | Chang .................... A43B 21/26 36/28 |
| 2017/0280824 | A1 | * | 10/2017 | Brown ................. A43B 13/182 |
| 2017/0336273 | A1 | * | 11/2017 | Elangovan ........... A43B 17/006 |
| 2019/0178325 | A1 | * | 6/2019 | Griffin .................... F16F 6/005 |

* cited by examiner

*Primary Examiner* — Blake A Tankersley

(57) ABSTRACT

There have been many types of sports shoes varying in design and material. The market-leading sports shoes are Nike and Asics. Nike is famous for its patented Air Max technology and Asics for its unique liquid cushioning element technology. These are excellent shoes in its own category. Yet, sports players are also looking for a shoe that can switch between the hi-rebound high performance sports mode and soft-cushioned regular mode conveniently. Our new design of the shoe sole tackles this task with a unique approach. We design the shoe sole into three zones according to its dynamic feature and fill the corresponding zones with different foaming material and an interchangeable compact MagLev module. This new design meets the challenge and opens up a new way for shoe manufacturing.

9 Claims, 8 Drawing Sheets

SHOE SOLE WITH ZONES FILLED WITH MULTIPLE FOAMING MATERIAL AND AN INTERCHANGEABLE COMPACT MAGLEV MODULE

BACKGROUND OF THE INVENTION

People wear shoes to protect their feet, reduce the shock to their feet and ankles from physical activity, and to provide support and comfort. Good footwear need to be comfortable, well-cushioned to support the feet during the activities. The bottom of a person's foot comes into contact with, and is supported by, the sole structure of their footwear so the sole is the most important part of a shoe that must be particularly well made for solid and comfortable support.

U.S. Pat. No. 6,234,987 B1 discloses a foot heel massaging device that is located in the heel of a shoe to massage the foot heel of a person wearing the shoe. The device consists of a fixed member located fixedly in the shoe heel, a movable member located movably on the fixed member and provided with a plurality of massaging knobs, a confining member for confining the fixed member and the movable member, and two magnets located respectively in the fixed member and the movable member. This invention uses the magnetic repulsion to turn the messaging knobs into circular motion to message the foot. It provides the shoe with a new function of massaging. It doesn't permit rapid vertical movement, such as the quick rebound that is required by the sports player.

U.S. Pat. No. 8,689,464 B2 discloses a magnetically-supported article of footwear that primarily supports a wearer's weight by repulsive magnetic forces from magnets arranged in and around the article's sole. The magnets are arranged between and around the article's insole and outsole and may be attached to pairs of magnetically-conductive plates located down the length of the article's sole. This invention provides a magnetic cushion to the traditional footwear. Its fixed bolts and nuts structure of the magnetic plates makes it bulky in dimension and it is only designed as a structure of exterior attachment.

In our article, we design a new type of shoe sole that can switch its function mode between the hi-rebound sports performance mode and the regular cushioning support mode. We use different foaming material for the different zones of the shoe sole via the injection molding and insert a compact MagLev module into the cavity located in the heel zone. This compact MagLev module can generate a quick-action magnetic repulsion force which aids in the rebound of the sports player greatly. It can also be replaced with a soft elastic cushion module when less reaction force but more comfort is desired. Compared with the prior arts in the sports shoe field, our article makes the most efficient use of the magnetic repulsion force that can be derived from our detachable compact MagLev module. It is designed with high performance in mind for sports players and well suited for any intensive sports activity such as the ball game and the track and field activity. When the players are not using it for intense sports activity, they can wear it in regular mode by replacing the compact MagLev module with a soft elastic cushion module. With this unique design, the sports shoe becomes versatile for the same wearer experiencing different condition.

SUMMARY OF THE INVENTION

The present invention relates to making a shoe sole with zones filled with multiple foaming material and an interchangeable compact MagLev module.

In our invention, we divide the shoe sole into three function zones according to its different dynamic feature i.e., two forefoot zones and a heel zone. The two forefoot zones are filled with TPU and EVA foaming material. The heel zone is designed with a cavity for placement of an interchangeable compact MagLev module. TPU and EVA are used based on its difference in elasticity since the forefoot is sensitive to outside impact and need different elasticity and comfort for the best cushioning and steering of the whole foot. For the forefoot area, the inner portion requires better gripping power and thus a better steering of the foot, so we fill this zone with hi-elasticity TPU material. For the outer portion of the forefoot, more comfort and softness is desired, so we fill this zone with soft EVA material. Then, we place the specially-made interchangeable compact MagLev module into the cavity of the heel zone. The method of making the compact MagLev module for shoe sole is as follows:

In FIG. 1a, attach two magnets to two steel plates separately via cold bonding. Then assemble the above cold-bonded magnet plates into a compact MagLev structure with cushion in between. In FIG. 1b, the compact MagLev structure is wrapped with an elastic protection layer such as silicone rubber. This layer provides extra protection against wear and tear to the key parts in the module. The above compact MagLev structure is then assembled into a compressible jacket, as shown in FIG. 2a. The compact MagLev module is interchangeable with a soft elastic cushion module as shown in FIG. 2b. The compressible jacket has a margin of +0.2 mm to allow for easy assembly of its interior components while not losing its integrity over the repetitive wear and tear. As shown in FIG. 3a, there are three zones in the shoe sole. The TPU and EVA are injected into the forefoot zones accordingly. In the heel zone, there is a cavity molded precisely for an interchangeable compact MagLev module. The housing margin of the cavity for the compact MagLev module is +0.5 mm so the whole assembly of the module fits snuggly inside the cavity. As shown In FIG. 3b, the interchangeable compact MagLev Module is inserted inside the heel zone to help generate a quick-action rebound. The lock up cushion is inserted afterwards to help secure the module in position firmly. FIG. 4 illustrates the process of placing an interchangeable compact MagLev module and lock up cushion into the cavity of the heel zone. The lock pin locates on both sides of the module and help guide the module into the track which is molded in the wall of the cavity. The interchangeable compact MagLev module travels down along the vertical track, then turns 90 degrees into a horizontal track. When it reaches the end of the horizontal track, the lock up cushion is inserted inside the cavity to help secure the module so it will not move during intense sports activity. In FIG. 5, H stands for the difference in height between the forefoot zones and the peak of the heel zone. The inner portion zone and the outer portion zone of forefoot area are leveled at same height. As shown in the same figure, C stands for the maximum compression distance of the inserted compact MagLev module. In our design, C is less than H. It is designed this way for the shoe sole to attain the maximum magnetic repulsion upon the full compression of inserted compact MagLev module. This interchangeable MagLev module helps boost the player's rebound greatly since each module can generate as much as 40 lbs of magnetic repulsion when fully compressed. The compact MagLev module is designed as an interchangeable unit with corresponding lockup cushion so the player can pick the proper MagLev module for the desired rebound. Generally, the module is made according to its maximum magnetic repulsion capacity such as small, medium and large.

Vice versa, the compact MagLev module can be taken out and replaced easily by an interchangeable soft elastic cushion module when a soft and more comfortable heel support is desired. The interchangeable soft elastic cushion has the same dimension as that of the compact MagLev module it replaces. The interchangeable soft elastic cushion also comes in various size and elasticity thus providing a wide choice of adjustment in the heel zone cushioning. This makes our shoe sole versatile in function. It is versatile with regard to the changing requirement of the wearer in shoe sole elasticity and comfort. This shoe sole minimizes the use of chemical fillers and has a good air permeability, which prevents the moisture from accumulate in the sole. It also prevents the growth of bacteria in the sole because of the magnetic field associated with the compact MagLev module. Thus, a shoe made with our innovative sole can provide the best performance as a high-end sports shoe. It can also be converted into a comfortable sneaker for daily wear. With our invention, it is cost-efficient to make the high-end sports shoe so that everyone who loves sports can afford to own a pair of the multi-function shoe, a shoe of their own dream.

REFERENCE

1. U.S. Pat. No. 6,234,987 B1 Mar. 1, 1999-May 22, 2001. Hsing-Yu Chen. Foot heel massaging device.
2. U.S. Pat. No. 8,689,464 B2, Oct. 28, 2010-Apr. 8, 2014. Jared David RODMAN, Joseph Andrew HABER. Magnetically-supported article of footwear.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in each drawing. In the drawings.

Figure 1A:
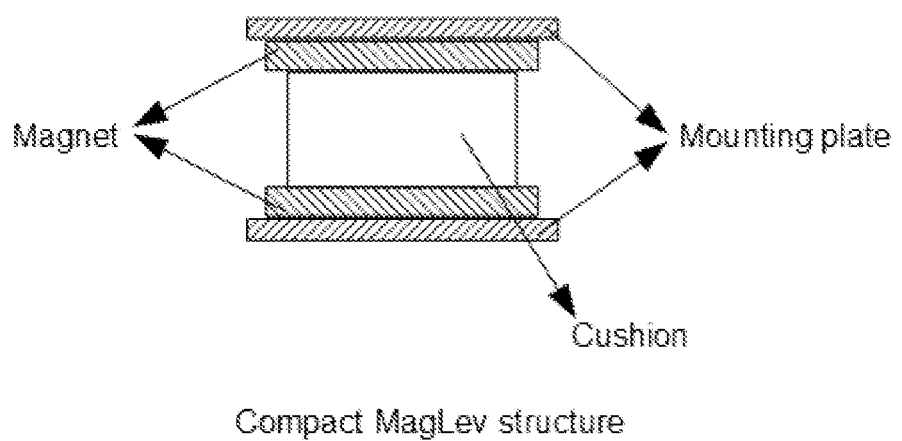
FIG. 1a shows a view of the compact MagLev structure.
Figure 1B:
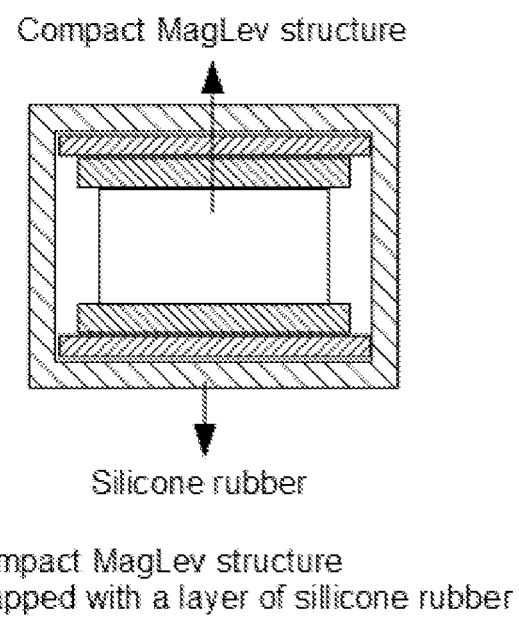
FIG. 1b shows a view of the compact MagLev structure wrapped with a layer of silicone rubber.
Figure 2A:
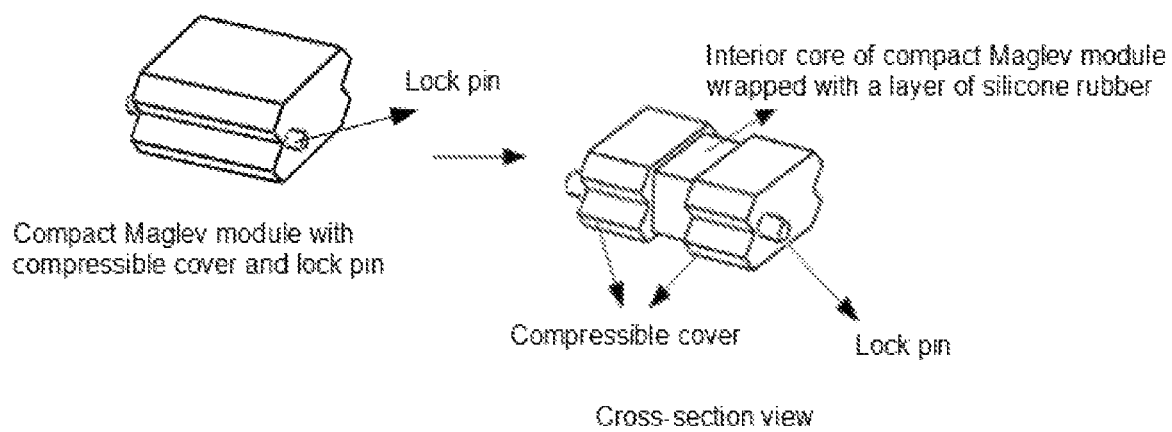
FIG. 2a shows a final assembly of interchangeable compact MagLev module with compressible cover and lock pin.
Figure 2B:
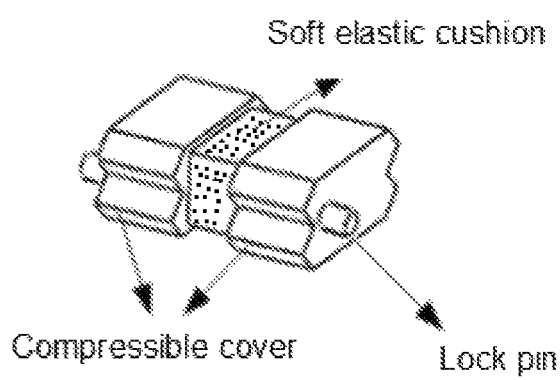
FIG. 2b shows a final assembly of interchangeable soft elastic cushion module with compressible cover and lock pin.
Figure 3A:
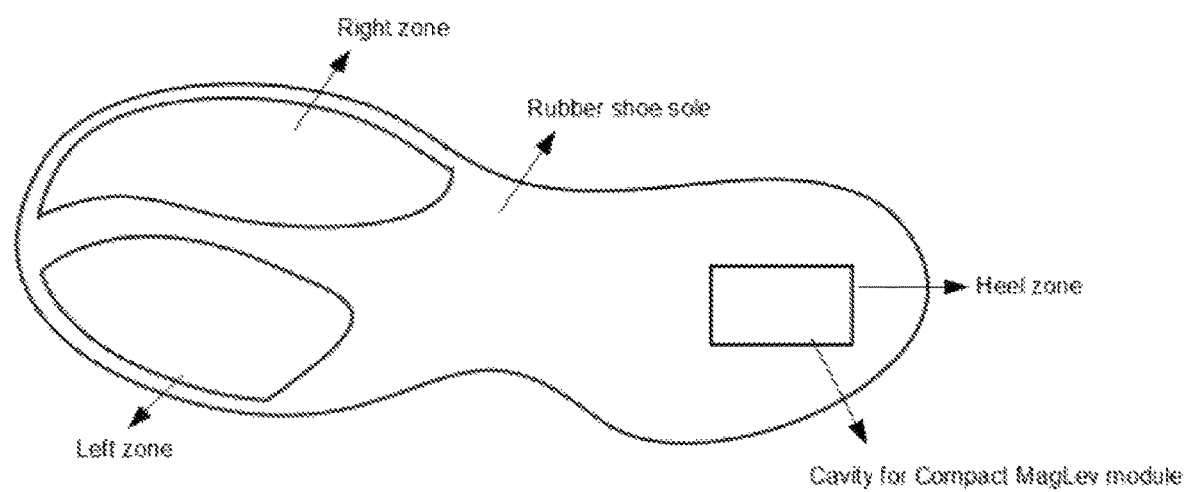
FIG. 3a illustrates a shoe sole with two forefoot zones and a cavity in the heel zone for an interchangeable compact MagLev module.
Figure 3B:
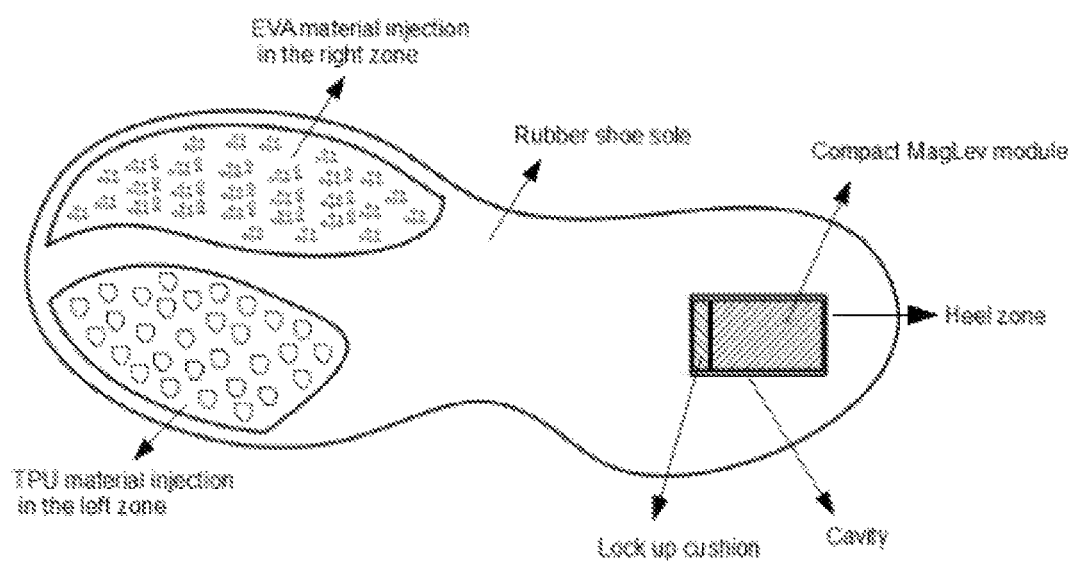
FIG. 3b shows a detailed view of a shoe sole with forefoot zones filled with TPU, EVA foaming material and a heel zone with an interchangeable compact MagLev module.
Figure 4:
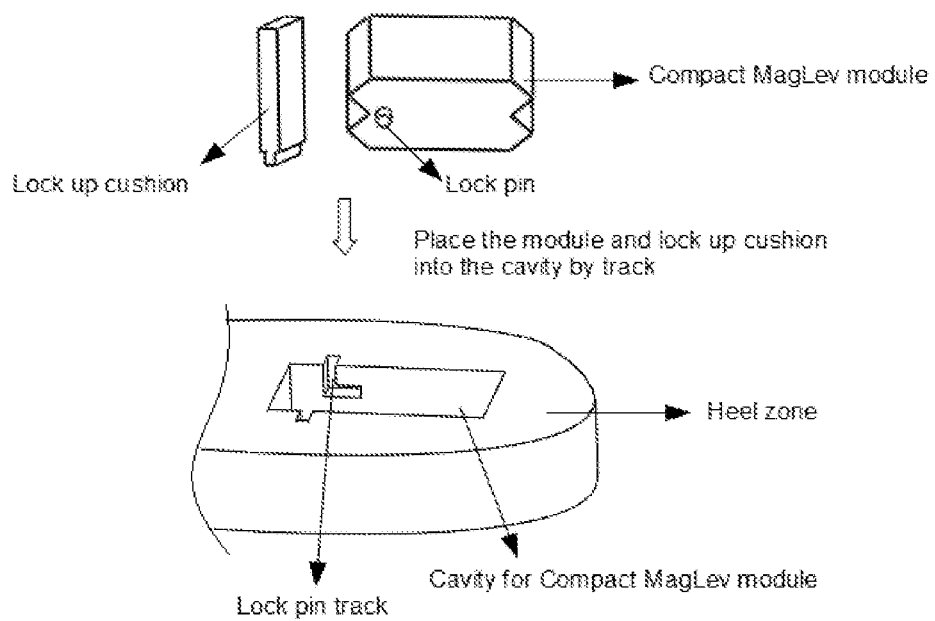
FIG. 4 illustrates placing an interchangeable compact MagLev module and its lock up cushion into the cavity of the heel zone.
Figure 5:
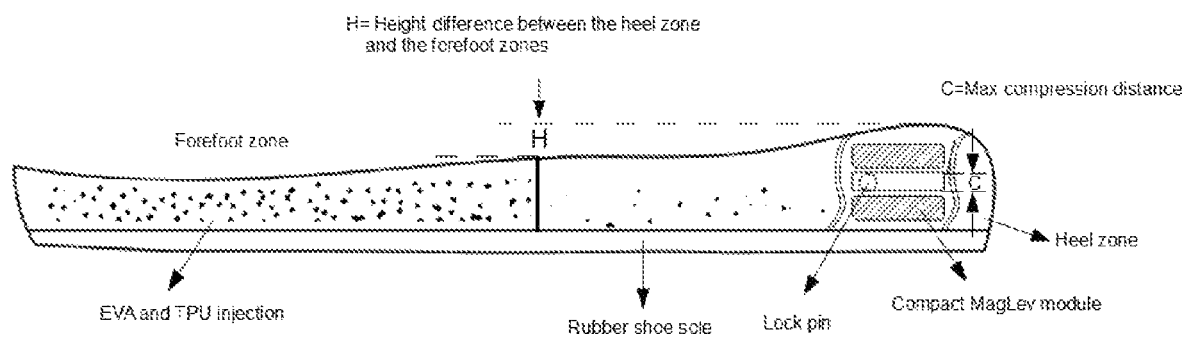
FIG. 5 illustrates the height difference between the forefoot zones and heel zone where the interchangeable compact MagLev module is placed.

What is claimed:

1. A compact maglev module made by a process comprising:
    attaching two permanent magnets to two steel plates separately via cold bonding to form two cold-bonded magnet plates;
    attaching the cold-bonded magnet plates to a cushion with the cushion being in between the cold-bonded magnet plates so as to form a compact maglev structure;
    wrapping the compact maglev structure with an elastic protection layer; and
    assembling the compact maglev structure with the protection layer into a compressible jacket.

2. The maglev module of claim 1, wherein the elastic protection layer has a thickness between 0.3 mm and 2 mm.

3. The maglev module of claim 1, wherein the elastic protection layer has a tensile strength between 20 MPa and 120 MPa.

4. The maglev module of claim 1, wherein the elastic protection layer is made with elastic material having a hardness between 30 Shore A and 75 Shore A.

5. The maglev module of claim 1, wherein the compressible jacket has lock pins on its sides.

6. The maglev module of claim 1, wherein the compressible jacket is +0.2 mm larger than the elastic protection layer to accommodate the compact maglev structure wrapped in the elastic protection layer.

7. The maglev module of claim 1, wherein the compressible jacket has a tensile strength between 60 MPa and 200 MPa.

8. The maglev module of claim 1, wherein the compact maglev module is made to perform a maximum compression distance of C.

9. The maglev module of claim 8,
    wherein the maglev module is configured to fit inside a shoe sole which has a heel zone and forefoot cushion zones, there being a height difference of H between the heel zone and the forefoot cushion zones, and
    wherein the maximum compression distance C is less than the height difference H.

* * * * *